United States Patent
Delling et al.

(10) Patent No.: US 10,018,476 B2
(45) Date of Patent: Jul. 10, 2018

(54) LIVE TRAFFIC ROUTING

(71) Applicant: Apple Inc., Cupertino, CA (US)

(72) Inventors: Daniel Delling, Sunnyvale, CA (US); Supratik Maitra, Sunnyvale, CA (US); Dennis Schieferdecker, Cupertino, CA (US); Christian Sommer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 15/239,678

(22) Filed: Aug. 17, 2016

(65) Prior Publication Data
US 2018/0052002 A1 Feb. 22, 2018

(51) Int. Cl.
G01C 21/34 (2006.01)

(52) U.S. Cl.
CPC .................. G01C 21/3492 (2013.01)

(58) Field of Classification Search
CPC .................................................. G01C 21/3492
See application file for complete search history.

(56) References Cited

U.S. PATENT DOCUMENTS

| | | | |
|---|---|---|---|
| 6,016,485 A | 1/2000 | Amakawa et al. | |
| 8,249,810 B2 | 8/2012 | Jones | |
| 8,364,717 B2 | 1/2013 | Delling et al. | |
| 8,494,771 B2 | 7/2013 | Delling et al. | |
| 8,583,363 B2 | 11/2013 | Abraham et al. | |
| 8,738,559 B2 | 5/2014 | Delling et al. | |
| 8,824,337 B1 * | 9/2014 | Geisberger | G01C 21/3446 370/238 |
| 8,886,573 B2 | 11/2014 | Delling | |
| 9,175,972 B2 | 11/2015 | Geisberger | |
| 9,212,920 B1 | 12/2015 | Mannepalli et al. | |
| 9,222,791 B2 | 12/2015 | Delling | |
| 9,279,692 B2 | 3/2016 | Wellmann | |
| 9,299,251 B2 | 3/2016 | Scofield et al. | |
| 9,443,034 B2 | 9/2016 | Werneck et al. | |
| 2004/0039520 A1 * | 2/2004 | Khavakh | G01C 21/34 701/411 |
| 2005/0071077 A1 | 3/2005 | Kadono et al. | |
| 2007/0244632 A1 | 10/2007 | Mueller | |
| 2008/0275643 A1 * | 11/2008 | Yaqub | G01C 21/343 701/412 |
| 2009/0125229 A1 | 5/2009 | Peri et al. | |

(Continued)

FOREIGN PATENT DOCUMENTS

| | | |
|---|---|---|
| EP | 2551639 | 1/2013 |
| EP | 2730891 | 5/2014 |

OTHER PUBLICATIONS

International Search Report and the Written Opinion for application No. PCT/US2017/044254, dated Oct. 12, 2017, pp. 12 pages.

(Continued)

Primary Examiner — Rodney A Butler
(74) Attorney, Agent, or Firm — Womble Bond Dickinson (US) LLP

(57) ABSTRACT

Live traffic routing in a mobile navigation system generates alternate routes based on the user's current location, live traffic conditions and estimated time of arrival at certain locations along the route. Live traffic routing re-ranks alternate routes taking into account which routes offer the best cost path to the user's destination.

21 Claims, 6 Drawing Sheets

(56) References Cited

U.S. PATENT DOCUMENTS

| | | |
|---|---|---|
| 2011/0153191 A1 | 6/2011 | Dhanani |
| 2011/0295497 A1 | 12/2011 | Abraham et al. |
| 2012/0143504 A1 | 6/2012 | Kalai et al. |
| 2012/0148102 A1 | 6/2012 | Moriguchi |
| 2012/0179674 A1 | 7/2012 | Delling et al. |
| 2012/0192138 A1 | 7/2012 | Delling et al. |
| 2012/0250535 A1 | 10/2012 | Delling et al. |
| 2012/0254153 A1 | 10/2012 | Abraham et al. |
| 2012/0254597 A1 | 10/2012 | Delling et al. |
| 2012/0310523 A1 | 12/2012 | Delling et al. |
| 2013/0060468 A1 | 5/2013 | Delling et al. |
| 2013/0132369 A1 | 5/2013 | Delling et al. |
| 2013/0144524 A1 | 6/2013 | Abraham et al. |
| 2013/0231862 A1 | 9/2013 | Delling et al. |
| 2013/0268549 A1 | 10/2013 | Delling et al. |
| 2014/0107921 A1 | 4/2014 | Delling et al. |
| 2014/0129594 A1 | 5/2014 | Delling et al. |
| 2015/0160023 A1 | 6/2015 | Goel et al. |
| 2015/0192422 A1* | 7/2015 | Adam ................ G01C 21/3492 701/118 |
| 2015/0347625 A1 | 12/2015 | Werneck et al. |
| 2015/0347629 A1 | 12/2015 | Pajor et al. |
| 2015/0356759 A1 | 12/2015 | Delling et al. |
| 2016/0078148 A1 | 3/2016 | Werneck et al. |
| 2016/0223355 A1 | 8/2016 | Habib et al. |
| 2017/0208540 A1 | 7/2017 | Egner et al. |

OTHER PUBLICATIONS

International Search Report and the Written Opinion for application No. PCT/US2017/044255, dated Oct. 11, 2017, pp. 12 pages.

Carlsen, Mads V., et al., "Finding Alternative Shortest Paths in Road Networks for Mobile Traffic Navigation", ACM Transactions on Embedded Computing Systems, (Jun. 2012), 1-12.

Delling, Daniel, et al., "Landmark-based routing in dynamic graphs", WEA'07 Proceedings of the 6th international conference on Experimental algorithms, (Jun. 6, 2007).

Goldberg, et al., "Better Landmarks within Reach", WEA '07 Proceedings of the 6th international conference on Experimental algorithms (2007).

Gutman, Ron, "Reach-based routing: A new approach to Shortest Path", Society for Industrial and Applied Mathematics, Proceedings 6th Workshop on Algorithm Engineering and Experiments (ALENEX) (2004), (Jan. 6, 2004).

* cited by examiner

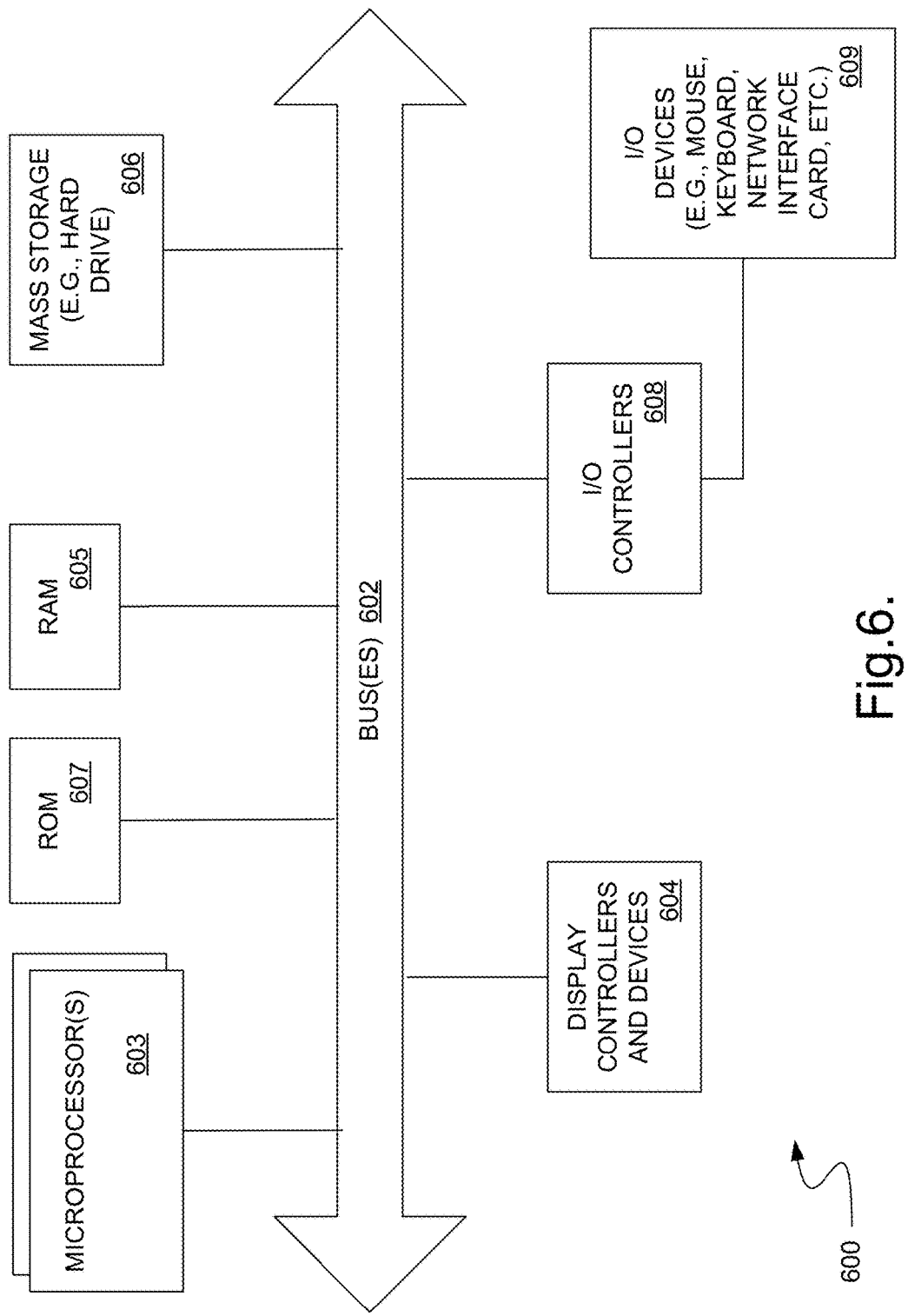

LIVE TRAFFIC ROUTING

BACKGROUND

Mobile navigation systems in location-aware devices are now common. Mobile device navigation and car navigation systems have grown in popularity with the ability to provide up-to-date navigation information and visual map-based navigation aids to users en route.

Searching for the best routes at certain times of day can present problems in navigation systems because of the need to adjust the results based on the user's location and current traffic conditions. However calculating updated routes based on current traffic conditions can be computationally expensive. In addition an alternate route to accommodate traffic conditions alone may not always be the best choice.

SUMMARY OF THE DESCRIPTION

Methods, processes, apparatus, machine-readable tangible storage media, and data processing systems are described for best cost path routing, including minimum cost path identification, live traffic routing, and on-demand shortcut computation in a mobile navigation system. In a navigation system on a mobile device, live traffic routing helps a user choose the best alternate route from source S to destination D as compared to their current route, including displaying one or more of the alternate routes having the best cost path, where cost can be measured in terms of any one or more of travel time, travel distance, amount of traffic and/or number of detours encountered during travel. The best cost path determination is based on current route conditions, e.g. time of travel, traffic and road closures.

In one embodiment, minimum cost path identification provides a computationally efficient way to identify minimum cost paths that avoid local detours, where a local detour is a temporary path around a blocked sub-path that renders unacceptable an otherwise acceptable minimum cost path. In one embodiment, minimum cost path identification determines which alternative routes avoid blocked sub-paths by evaluating a local optimality of the sub-paths based on static costs. Each sub-path is a portion, or segment, of the full path or route.

According to one embodiment, live traffic routing identifies which via nodes of the alternative routes identified as having minimum cost paths generate the best cost paths. Via nodes are known traffic junctions for which routing information is generally already available. A via node defines a path in a road network by the minimum cost path from the origin to the via node, and the minimum cost path from the via node to the destination. In one embodiment, live traffic routing evaluates the local optimality of sub-paths based on dynamic costs to eliminate alternative routes that that contain non-optimal road segments. In one embodiment, evaluating the local optimality of sub-paths based on dynamic costs can take into account current traffic or conditions (e.g., accidents, damaged roads, etc.) along a portion of the full path or route covered by the sub-path.

In one embodiment, local optimality is an optimal or near optimal solution that is derived or computed along only the portion of the full path or route while ignoring the rest of the full route or path. The solution can use conventional techniques in determining what is optimal or near optimal but is constrained to the portion rather than the full path or route. The constraint in effect sets a start and end point that defines the portion of the full path or route.

According to one embodiment, live traffic routing further determines an amount of overlap between alternative routes and a current route being followed by the navigation application on the mobile device.

According to one embodiment, the live traffic routing ranks the via nodes of the alternative routes in best cost path order based on any one or more of the evaluated local optimality and the amount of overlap of the respective alternative routes.

According to one embodiment, on-demand shortcuts provide a computationally efficient determination of the minimum cost path for a portion of a route. For example, on-demand shortcut computation re-computes shortcuts as needed when existing shortcuts in a last recently used (LRU) cache are either unavailable or need updating.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 6 is a block diagram of a typical computer system that can be used in implementing live traffic routing and on-demand shortcut computation in a mobile navigation system in accordance with an embodiment of the invention.

DETAILED DESCRIPTION

Figure 1:
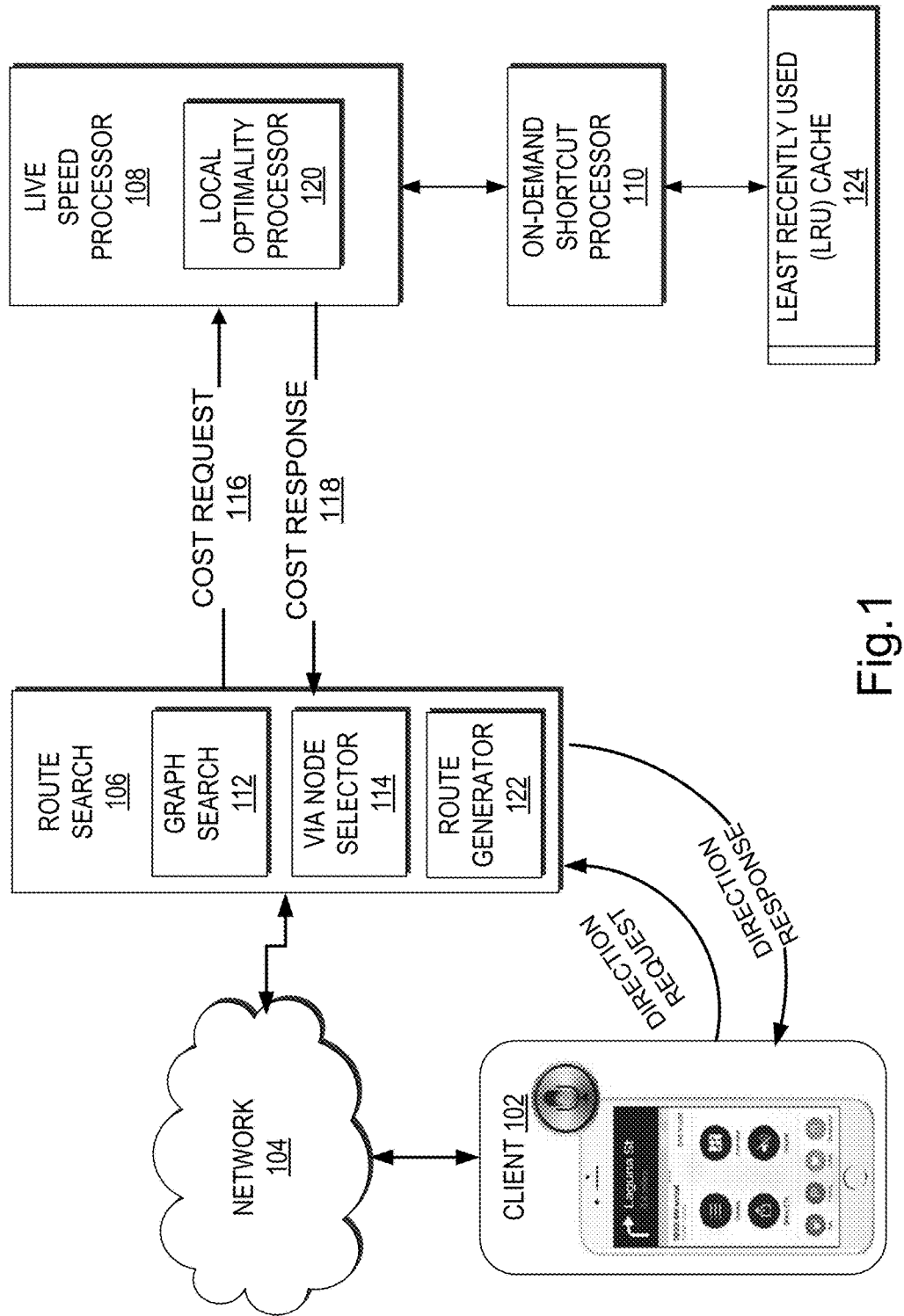
FIG. 1 is a block diagram overview of a live traffic routing and on-demand shortcut computation in a mobile navigation system in accordance with an embodiment of the invention.

Methods, processes, apparatus, machine-readable tangible storage media, and data processing systems are described for live traffic routing and on-demand shortcut computation in a mobile navigation system are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow are performed by processing logic that comprises hardware (e.g. circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In accordance with embodiments of the invention, live traffic routing is advantageously used to efficiently compute routes that take into account the route's cost in traffic, including identifying alternative routes that have minimum cost paths based on static costs, re-computing the identified alternative routes based on current traffic data, i.e. live traffic routing and, for any routing processes using cell-based routing, computing or re-using shortcuts for a cell as needed based on current traffic data, i.e. on-demand shortcuts.

In a navigation system on a mobile device, it is desirable to be able to provide alternative routes to a user that take into account traffic and other road conditions. Identifying alternative routes can be performed using various route navigation platforms that can identify a route between source S and destination D. But simply identifying alternative routes does not necessarily provide a user with the best available routes.

Route identification and computation can be carried out on a number of different route navigation platforms. One such route navigation platform is a cell-based routing platform that partitions the navigation area into a graph of connected cells, each cell representing a portion of the navigation area that contains a particular number of intersections, nodes, and road segments. In one embodiment, for any routing processes using a cell-based routing platform, computing or re-using shortcuts for a cell as needed is based on current traffic data. Cell-based routing reduces the complexity of the computations while returning high quality route information to the user of the navigation system. Regardless of the routing platform, identifying and computing alternative routes can be computing-intensive.

FIG. 1 is a block diagram overview of a routing system in a mobile navigation system in accordance with an embodiment of the invention. As shown, in one embodiment, a client device 102, such as the mobile phone illustrated in FIG. 1, activates live traffic routing, causing the client 102 to access a route search process 106 via network 104. In other embodiments, the client device 102 could also include other mobile location-aware devices, including a smart watch, such as the Apple Watch, or a car navigation system.

In one embodiment, the route search 106 commences a via node selector 114 process that interacts with a live speed processor 108 to respond to requests for current traffic costs 116/118. The live speed processor 108 accesses live traffic data in response to requests for current traffic costs 116/118. In one embodiment, the live speed processor 108 includes a local optimality processor 120 to determine whether the routes traverse any sub-paths that are blocked. Once local optimality processor 120 has identified the via nodes that provide routes avoiding blocked sub-paths, the via node selector 114 processes the routes to determine which provide the best cost paths taking into account live traffic data, and ranks the via nodes in best cost path order. In one embodiment, the route generator 122 generates the routes for display in best cost path order on the client device 102 via network 104, and the client 102 can then interact with system to obtain directions.

By way of example only, in one embodiment, the route search process 106 initiates a graph search 112 of a cell-based routing platform responsive to the mobile user's search. The graph search 112 partitions the navigable area into cells with a particular number of intersections, nodes and road segments. To further enhance the performance of generating navigable routes for a mobile navigation system, in one embodiment, an on-demand shortcut processor 110 accesses a last recently used LRU cache 124 to generate new or updated shortcuts as needed for a given cell encountered during the route search 106, including during the live-speed processor 108 functions for generating routes.

In one embodiment, the LRU cache 124 is a global LRU cache that contains values representing shortcuts for one or more cells of a cell-based routing graph. Each value can be accessed with a key comprised of a combination of cell number and any one or more cost functions and/or traffic configurations that determine how a shortcut is computed.

In one embodiment, the cost functions available for any given cell represented in the global LRU cache 124 can vary and include both standard functions and specialized functions. The standard functions are typically less computing intensive and return shortcuts that do not take into account special characteristics of the cell. For example, a standard function can be a function that takes into account static information about the cell such as travel distance, but not the traffic configurations such as live traffic data. In contrast, the specialized functions are more computing intensive because they do take into account special characteristics of the cell. For example, a specialized function can be a function that takes into account whether there are toll roads or restricted access roads in the cell, and is therefore configured to return shortcuts that avoid tolls or restricted access roads and the like.

In one embodiment, traffic configurations available for any given cell vary and can include traffic configurations at certain timestamps, certain dates, during certain road construction events and the like. The traffic configurations can affect how the shortcuts are computed using specialized functions that take into account the traffic configuration affected by live traffic data.

In one embodiment, the global LRU cache 124 includes metadata for reducing the use of cost functions for more efficient shortcut computation. For example, the LRU cache 124 can include metadata for any given cell that indicates any one or more of an absence of toll roads in that cell and/or an absence of restricted access roads to be avoided. In one embodiment, the metadata obviates or reduces the need to use specialized cost functions for those cells for which the specialized cost function is irrelevant. For example, there is no need compute shortcuts using the specialized cost function for avoiding tolls if there are no tolls in a given cell—a standard cost function can be used instead.

Figure 2:
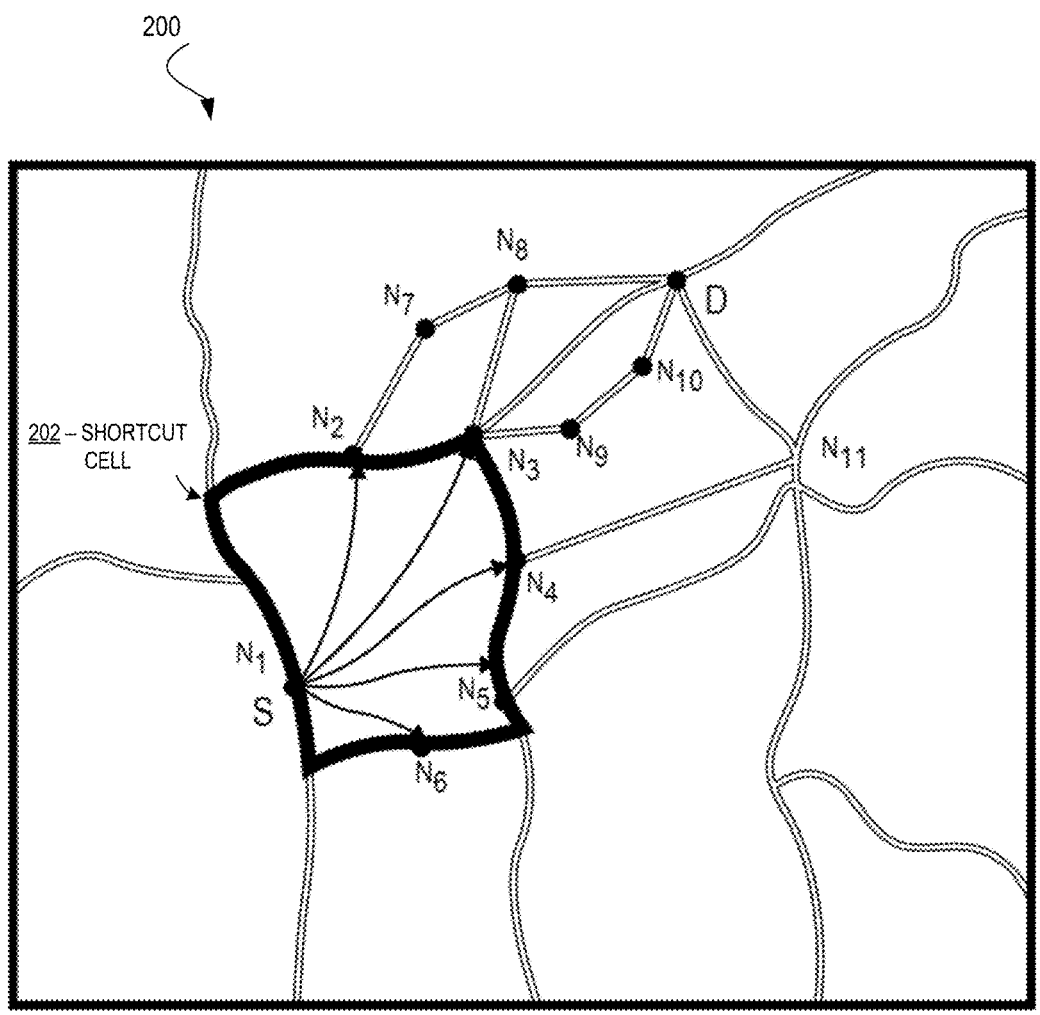
FIG. 2 is an illustration of exemplary cells into which a navigable area can be partitioned in preparation for live traffic routing and on-demand shortcut computation in a mobile navigation system in accordance with an embodiment of the invention.

In the illustrated example in FIG. 2, an example cell 200 or other portion of a navigable area reveals a start location S and destination location D, and a selection of eleven nodes N1 . . . N11 that could be encountered when traversing any one of a number of paths between start S and destination D. In one embodiment, each node can be processed to determine whether to identify the node as a via node. During live traffic routing, once identified, the via nodes are processed and ranked in accordance with embodiments of the invention.

In the illustrated example of FIG. 2, by way of example only, a cell 202 for which a shortcut is maintained in the global LRU cache 124 (FIG. 1) is shown having an entry point at node N1 and multiple exit points at nodes N2, N3, N4, N5, and N6. The entry and exit points reference the point at which a path intersects a cell boundary from the perspective of the direction of travel. In one embodiment, the on-demand shortcut processor 110 (FIG. 1) determines a current optimal shortcut, i.e. the minimum cost path, through the cell 202. The minimum cost path for a shortcut is typically based on the time cost of travel, but could also be based on other criteria, such as whether the minimum cost path encounters a traffic jam during the projected time of travel. For example, the shortcut from entry point N1 to exit point N3 could be determined as the current optimal shortcut, resulting in the identification of an alternative route from source S to destination D along via node N3 that includes road segment N1 to N3.

Figure 3:
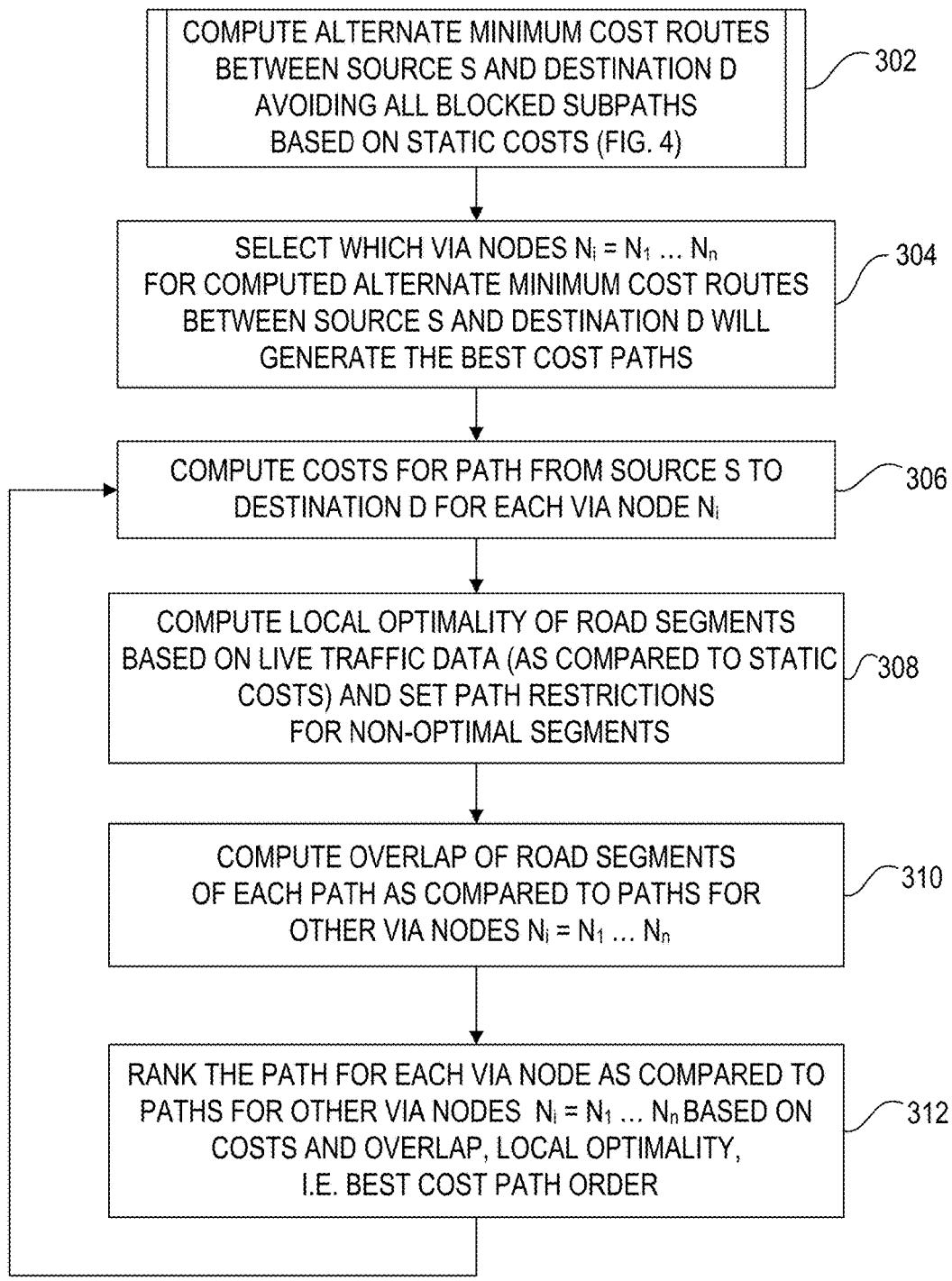
FIG. 3 is a summary overview of exemplary process logic for live traffic routing in accordance with an embodiment of the invention.

With reference to FIG. 3, in one embodiment, a live-traffic routing process 300 obtains alternate routes for navigating between source S and destination D within a particular navigation area such the one illustrated in FIG. 2. By way of example only, the alternate routes could be obtained using a cell-based routing platform that divides the navigation area into a graph of nodes from which alternate routes can be identified.

In one embodiment, the alternate routes, however identified, traverse via nodes, where each via node is associated with one or more of the alternate routes between the source S and destination D. The live traffic routing process 300 identifies those via nodes that are likely to provide the user with best alternate routes using live-traffic input.

In one embodiment, the live-traffic process 300 includes a process 302 that first computes the alternate minimum cost routes between source S and destination D based on their static costs. The static costs includes the travel time based on traveling the path without traffic, physical distance of the sub-path, the number of intersections encountered along the sub-path, the default speed limit and so forth. Process 302 also computes only those alternate minimum cost routes that avoid blocked subpaths, as described in further detail in FIG. 4, as alternate routes that encounter blocked subpaths are unlikely to be minimum cost routes.

In one embodiment, once the alternate minimum cost routes are computed in process 302, the live-traffic process 300 initiates a via node selection process 304 to select which of the via nodes node $N_i = N_1, \ldots N_n$ associated with the alternate minimum cost routes will generate the best cost paths. Process 306 begins the via node selection by computing the dynamic costs of traveling a path between the source S to each via node $N_i$ and on to the destination D. The dynamic costs include the cost of traveling the path in traffic based on live traffic data.

In one embodiment, rather than simply comparing the costs of the entire path with and without traffic using the static and dynamic costs, the live-traffic process 300 uses a dynamic local optimality process 308 that quantifies a local optimality of individual segments in the path based on live traffic data. In this manner, the local optimality process 308 advantageously minimizes the computational load of computing the costs of traveling the path in traffic while preserving accuracy.

In one embodiment, breaking the path into individual segments is based on static cost of the path and/or the intersections along the path. The local optimality is quantified by setting a path restriction for those segments whose dynamic costs exceed the minimum acceptable traffic cost based on live traffic data. For example, if the dynamic cost of traveling a particular segment exceeds the static cost of traveling that segment by more than a threshold amount of 4 minutes, then the local optimality process 308 sets a path restriction for that segment. In other examples, a smaller or larger threshold amount of minutes can be used, e.g. 1 minute, 5 minutes, and so forth. The greater the number of path restrictions set for a given path, the lower the rank of the via node associated with that path.

In one embodiment, at process 310, the via node selection process also keeps track of the amount of overlap between the path and a current route as compared to amount of overlap for the respective paths generated for other via nodes. For example, paths whose overlap with a current route exceeds a percent threshold amount of 80 percent can be ranked lower than paths with less overlap to avoid ranking paths with little benefit higher than paths providing more diverse route options. In other examples, a smaller or larger threshold percent of overlap can be used, e.g. 70 percent, 90 percent, and so forth.

In one embodiment, the via node selection process applies an algorithm that ranks the via nodes into a best cost path order 312 taking into account the computed local optimality of one or more segments in the path as compared to the local optimality of paths generated for other via nodes. In one embodiment, the ranking is based on one or more of the following ranking parameters/path characteristics: least static cost, least dynamic cost, shortest distance, least amount of overlap with the current route and the least number of path restrictions. The greater number of path restrictions that a particular path has, the lower the rank of the via node for that path. The ranking parameters can be query specific. For example, different parameters can be used when origin and destination are close to each other than when they are far apart.

In one embodiment, when an insufficient number of via nodes are selected as providing best cost paths of travel, then the criteria by which via nodes are selected can be relaxed. For example, in one embodiment, the threshold for exceeding the minimum acceptable traffic cost for quantifying local optimality and setting a path restriction may be increased so that fewer sub-paths are restricted. Other criteria, such as thresholds for the distance/length and amount of overlap of the paths of travel considered to be acceptable, may be altered as well.

In one embodiment, once the via nodes are ranked, the navigation application displays on a location-aware device or other type of device operating the navigation application, the one or more alternate routes between the source and the destination ranked as having the best cost paths.

In accordance with one embodiment, another way of enhancing cell-based routing is to compute a shortcut through a cell. Each cell is associated with any number or entries and exits. A novel process for computing the minimum cost path, or shortcut, between the entries and exits is described.

Figure 4:
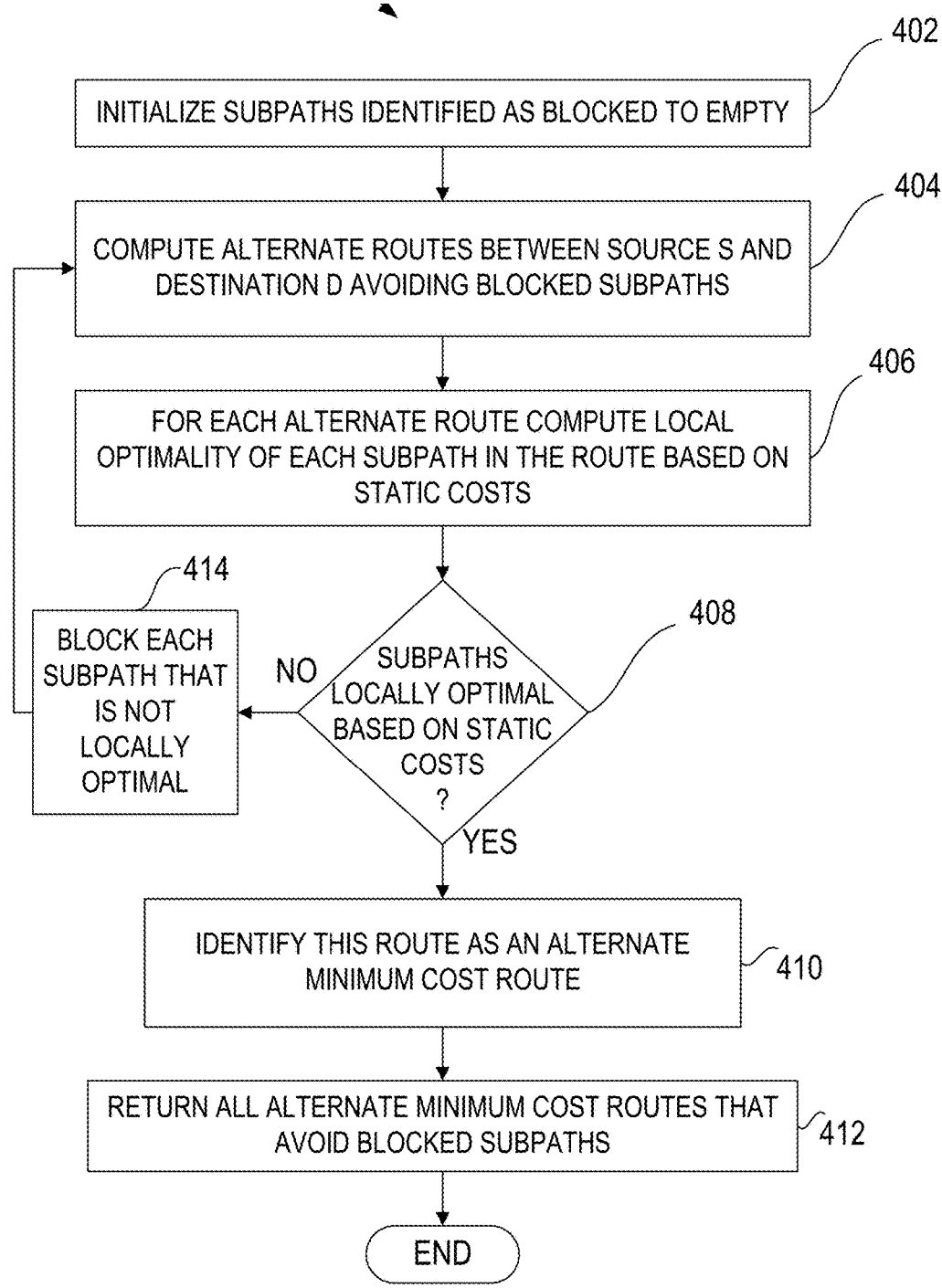
FIG. 4 is a summary overview of exemplary process logic for identifying minimum cost paths in accordance with an embodiment of the invention.

With reference to FIG. 4, an overview of the process 302 introduced in FIG. 3 is illustrated in further detail. A process 402 first initializes a variable representing whether there are sub-paths identified as blocked to empty in preparation for computing those alternate routes that avoid blocked sub-paths.

In one embodiment, process 404 begins a processing loop 404-408 to compute alternate routes that avoid the blocked sub-paths by evaluating 406 for each alternate route, the local optimality of each sub-path in the route based on the static costs for that sub-path, i.e. the cost without taking traffic into consideration. Such static costs can include the physical distance of the sub-path, the number of intersections encountered along the sub-path, the default speed limit and so forth.

In one embodiment, at decision block 408, if the sub-paths of the alternate route are each found to be locally optimal based on the static costs, then at process 410 the alternate route is identified as an alternate minimum cost route. If not, then at process 414, the sub-path encountered along that sub-path is marked as blocked, and the process 400 logic returns to process 404 to recomputed alternate routes between source S and destination D avoiding blocked sub-paths.

In one embodiment, the process loop 404-408 is repeated until all of the alternate minimum costs routes have been identified, i.e. all of the alternate minimum cost routes that avoid blocked sub-paths and that are found to be locally optimal. At process 412 the identified alternate minimum cost routes are returned to the live traffic process 300 for further processing of their respective via nodes.

Figure 5:
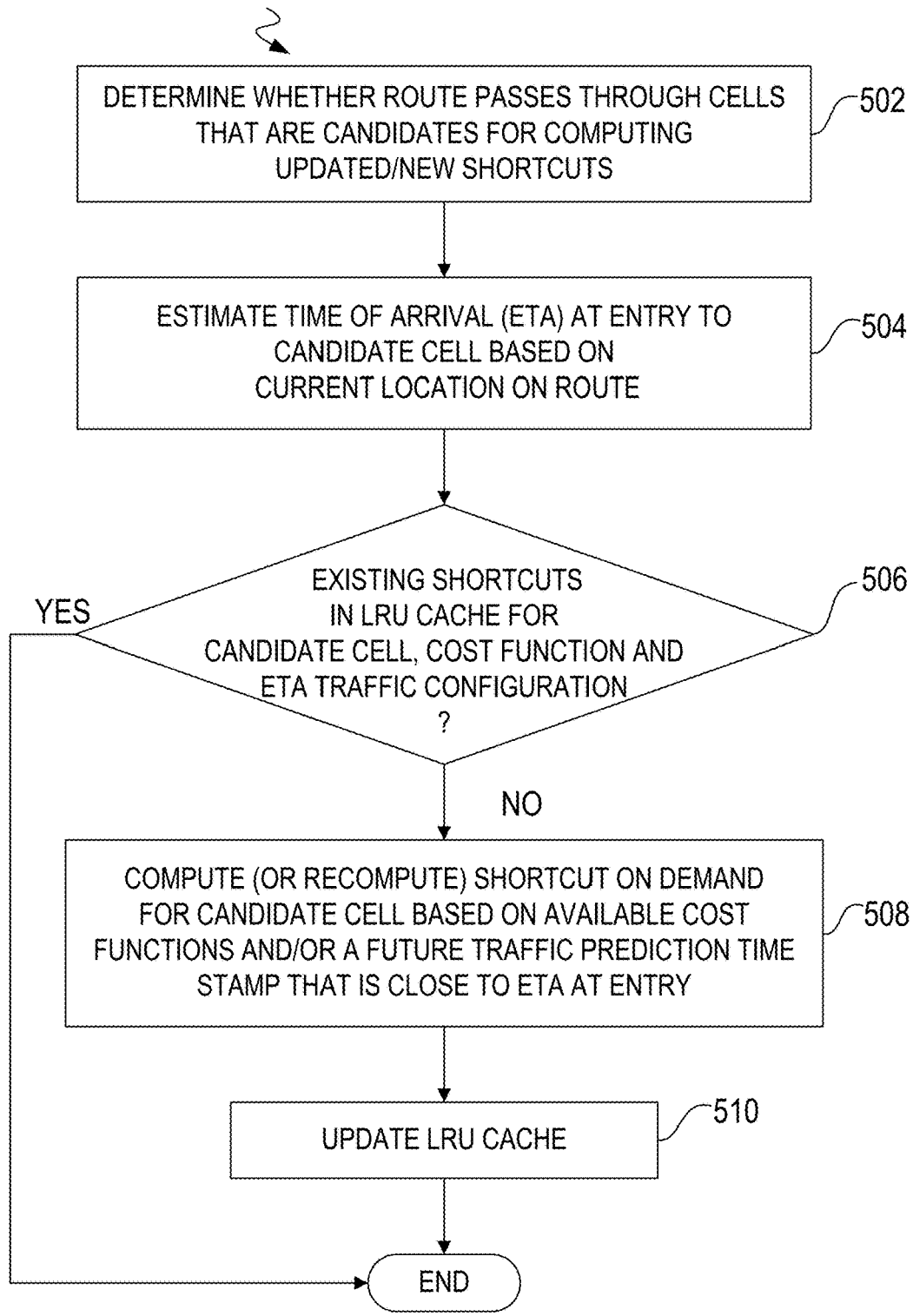
FIG. 5 is a summary overview of exemplary process logic for on-demand shortcut computation in accordance with an embodiment of the invention.

With reference to FIG. 5, after partitioning a map into cells having comparable numbers of intersections, an on-demand shortcut process 500 interoperates with a LRU global cache (124 (FIG. 1) containing a pre-computed minimum cost path entry/exit combination for one or more cells, referred to herein as a shortcut through the cell. The pre-computation is typically based on a static cost of travel from each entry into the cell to each exit from the cell. During the on-demand shortcut process 500, an on-demand shortcut can be re-computed, or computed for the first time if a pre-computed shortcut does not exist, based on dynamic costs of travel from each entry into the cell to each exit from the cell. Therefore an on-demand shortcut can differ from the pre-computed shortcut.

In accordance with one embodiment, the on-demand shortcut process 500 maintains the LRU global cache (124 in FIG. 1). In addition to containing values for the shortcuts through cells, the LRU global cache contains any cost functions and/or traffic time stamps associated with a most recent traffic report, if any, received for a cell. During operation, typically in response to generating a route traversing a cell, the on-demand shortcut process 500 re-computes on demand that cell's minimum cost path entry/exit combination from among all of the cell's possible entry/exit combinations, i.e. the cell's shortcut.

In one embodiment, to minimize unnecessary re-computations, the process 500 first determines at process 502, whether the route under consideration passes through cells that are candidates for re-computed updated or new shortcuts. If so, at process 504, the process 500 optionally estimates the time of arrival (ETA) at entry to the candidate cell in preparation for computing an on-demand shortcut, where the ETA is based on the mobile user's current location on the route. For example, in one embodiment, the computation of the on-demand shortcut at a subsequent process 508 is based on the updated traffic report closest to the mobile user's ETA.

In one embodiment, at decision block 506, the process 500 determines whether there are existing shortcuts in the global LRU cache for the candidate cell, including shortcuts for the desired cost function and the ETA traffic configuration. If not, then at process 508 the on-demand shortcut process 508 computes or re-computes the shortcut on-demand. The computation of the on-demand shortcut can be based on any one or more of the available cost functions maintained for cells in the LRU cache. The cost functions can include cost functions for avoiding restricted access roads, toll roads, and the like. As noted above the computation can also be based on a traffic configuration such as a future traffic prediction with a time stamp that is close to the ETA at entry to the cell.

In one embodiment, the on-demand shortcut request process 500 includes processing requests for shortcuts for a combination of a) cell identification number identifying the candidate cell together with one or more of b) a cost function identification identifying a particular type of cost function, and c) a particular traffic configuration. If the LRU global cache contains shortcuts for the requested combination then the existing shortcut is used without re-computation. Otherwise, the shortcut is computed on-demand.

In one embodiment, if a shortcut for the requested combination does not exist for a desired traffic configuration, then the process 500 can initiate a request for a more recent traffic report for the candidate cell. In one embodiment, the on-demand process optionally determines whether the updated traffic time stamp indicates a predicted traffic report (e.g. a predicted rush hour, detour, and the like). In that case, the process 508 re-computes the shortcut only if the request actually results in a more recent traffic time stamp, i.e. only when there is actually new traffic to report, or when there is predicted traffic to report. In this situation the process 500 uses the ETA of the mobile user to the cell as described in process 504. In this situation, the process 508 bases the on-demand minimum cost path computation on the updated traffic report closest to the user's ETA.

When the request does not result in an updated traffic time stamp, then the process 500 re-uses the existing minimum cost path/shortcut for the cell. The existing minimum cost path can be the pre-computed minimum cost path or a previous on-demand computed minimum cost path if one has been performed.

In one embodiment, whenever the process 508 computes a shortcut, then process 510 updates the LRU global cache 124 (FIG. 1) so that the values contained in the LRU global cache represent the last recently used shortcut.

In one embodiment, once the minimum cost path/shortcut for the cell is determined, whether through re-computation or re-use of the existing minimum cost path/shortcut, the on-demand shortcut process 500 returns control to a process that generates the route traversing the cell. For example, the live-traffic routing process 300 uses the on-demand shortcut that was computed or re-uses the existing shortcut, whichever the process 500 determined, when generating the alternative routes having the best cost paths.

In one embodiment, to minimize the computation costs of on-demand shortcut computation, the process 508 employs reduction rules. For example, in one embodiment, the LRU global cache 124 (FIG. 1) includes metadata to indicate whether a cell has no roads with tolls, in which case the on-demand shortcut computation can be performed with a standard cost function rather than a specialized cost function that avoids tolls.

Any one of the methods described herein can be implemented on a variety of different data processing devices, including general-purpose computer systems, special purpose computer systems, etc. For example, the data processing systems that may use any one of the methods described herein may include a desktop computer or a laptop computer or a tablet computer or a smart phone, or a cellular telephone, or a personal digital assistant (PDA), an embedded electronic device or a consumer electronic device.

FIG. 6 shows one example of a typical data processing system that may be used with the present invention. Note that while FIG. 6 illustrates the various components of a data processing system, such as a computer system, it is not intended to represent any particular architecture or manner of interconnecting the components as such details are not germane to the present invention. It will also be appreciated that other types of data processing systems that have fewer components than shown or more components than shown in FIG. 6 may also be used with the present invention. The data processing system of FIG. 6 may be, for example, an iOS device such as an iPhone, or a Macintosh computer from Apple Inc. of Cupertino, Calif.

As shown in FIG. 6, the data processing system 600 includes one or more buses 602 that serve to interconnect the various components of the system. One or more processors 603 are coupled to the one or more buses 602 as is known in the art. Memory 605 may be DRAM or non-volatile RAM or may be flash memory or other types of memory. This memory is coupled to the one or more buses 602 using techniques known in the art.

The data processing system 600 can also include non-volatile memory 607 that may be a hard disk drive or a flash memory or a magnetic optical drive or magnetic memory or an optical drive or other types of memory systems that maintain data even after power is removed from the system. The non-volatile memory 607 and the memory 605 are both coupled to the one or more buses 602 using known interfaces and connection techniques.

A display controller 604 is coupled to the one or more buses 602 in order to receive display data to be displayed on a display device 609 which can display any one of the user interface features or embodiments described herein. The display device 609 can include an integrated touch input to provide a touch screen.

The data processing system 600 can also include one or more input/output (I/O) controllers 608 which provide interfaces for one or more I/O devices, such as one or more mice, touch screens, touch pads, joysticks, and other input devices including those known in the art and output devices (e.g. speakers). The input/output devices 609 are coupled through one or more I/O controllers 608 as is known in the art.

While FIG. 6 shows that the non-volatile memory 607 and the memory 605 are coupled to the one or more buses 602 directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers.

As is known in the art, the one or more buses 602 may include one or more bridges or controllers or adapters to interconnect between various buses. In one embodiment, the I/O controller 608 includes a USB adapter for controlling USB peripherals and can control an Ethernet port or a wireless transceiver or combination of wireless transceivers.

It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 605 or the non-volatile memory 607 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software or to any particular source for the instructions executed by the data processing system.

Portions of what was described above may be implemented with logic circuitry such as a dedicated logic circuit or with a microcontroller or other form of processing core that executes program code instructions. Thus processes taught by the discussion above could be performed with program code such as machine-executable instructions that cause a machine that executes these instructions to perform certain functions. In this context, a "machine" may be a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM). Computer-executable instructions can be stored on non-volatile storage devices 606, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for generating a route in a location-based navigation application, the method comprising:
   computing a plurality of alternate minimum cost routes between a source and a destination in a location-based navigation application based on static costs of traveling one or more segments of the alternate minimum cost routes without traffic;
   computing dynamic costs of traveling the one or more segments of the alternate minimum cost routes with traffic; and
   ranking the alternate minimum cost routes between the source and the destination based on a comparison of the dynamic costs of traveling the one or more segments with traffic to the static costs of traveling the one or more segments without traffic.

2. The method of claim 1, further comprising quantifying a local optimality of the one or more segments of the alternate minimum cost routes based on whether the dynamic costs of traveling the one or more segments exceeds a minimum acceptable traffic cost based on live traffic data.

3. The computer-implemented method as in claim 2, wherein quantifying the local optimality of the one or more segments of the alternate minimum cost routes includes:
   breaking the alternate minimum cost route into the one or more segments;
   determining, for each segment, whether the dynamic costs of traveling the segment exceeds the minimum acceptable traffic cost based on live traffic data;
   adding a path restriction for each segment that exceeds the minimum acceptable traffic cost; and
   accumulating a total number of path restrictions added for each of the alternate minimum cost routes.

4. The method of claim 3, wherein determining whether the dynamic costs of traveling the segment exceeds the minimum acceptable traffic cost based on live traffic data includes:
   computing a difference between the dynamic costs of traveling the segment and the static costs of traveling the segment; and
   determining whether the difference exceeds a threshold amount.

5. The method of claim 1, further comprising computing an amount of overlap between each of the alternate minimum cost routes, wherein ranking the alternate minimum cost routes includes determining which alternate minimum cost routes have a least amount of overlap with other alternate minimum cost routes.

6. The method of claim 1, further comprising computing an amount of overlap between a current route being followed in the location-based navigation application and each of the alternate minimum cost routes, wherein ranking the alternate minimum cost routes includes determining which alternate minimum cost routes have a least amount of overlap with the current route.

7. The computer-implemented method as in claim 1, wherein the costs of traveling the one or more segments include any one or more of travel time, tolls encountered, and penalties associated with a type of roadway, the type of roadway including any one or more of highways, restricted access roads, restricted speed roads, primary roads, bypasses, local roads, paved roads and unpaved roads.

8. A system for generating a route in a location-based navigation application, the system comprising:
   a server operating a navigation service in communication with location-aware devices operating a location-based navigation application, the server having access to static and dynamic costs of travel, and further having a processor configured to:
   compute a plurality of alternate minimum cost routes between a source and a destination in the location-based navigation application based on static costs of traveling one or more segments of the alternate minimum cost routes without traffic;
   compute dynamic costs of traveling the one or more segments of the alternate minimum cost routes with traffic;
   rank the alternate minimum cost routes between the source and the destination based on a comparison of the dynamic costs of traveling the one or more segments with traffic to the static costs of traveling the one or more segments without traffic; and
   transmit the ranked alternate minimum cost routes to a location-aware device operating the location-based navigation application.

9. The system as in claim 8, the processor further configured to quantify a local optimality of the one or more segments of the alternate minimum cost routes based on whether the dynamic costs of traveling the one or more segments exceeds a minimum acceptable traffic cost based on live traffic data.

10. The system as in claim 9, wherein to quantify the local optimality of the one or more segments of the alternate minimum cost routes the processor is further configured to:
   break the alternate minimum cost routes into the one or more segments;
   determine, for each segment, whether the dynamic costs of traveling the segment exceeds the minimum acceptable traffic cost based on live traffic data;
   add a path restriction for each segment that exceeds the minimum acceptable traffic cost; and
   accumulate a total number of path restrictions added for each of the alternate minimum cost routes.

11. The system as in claim 10, wherein to determine whether the dynamic costs of traveling the segment exceeds the minimum acceptable traffic cost based on live traffic data the processor is further configured to:
   compute a difference between the dynamic costs of traveling the segment and the static costs of traveling the segment; and
   determine whether the difference exceeds a threshold amount.

12. The system as in claim 8, wherein the processor is further configured to compute an amount of overlap between each of the alternate minimum cost routes, and wherein the processor is further configured to determine which alternate minimum cost routes have a least amount of overlap with other alternate minimum cost routes.

13. The system as in claim 8, wherein the processor is further configured to compute an amount of overlap between the current route being followed in the location-based navigation application and each of the alternate minimum cost routes, and wherein the processor is further configured to determine which alternate minimum cost routes have a least amount of overlap with the current route.

14. The system as in claim 8, wherein the costs of traveling the one or more segments include any one or more of travel time, tolls encountered, and penalties associated with a type of roadway, the type of roadway including any one or more of highways, restricted access roads, restricted speed roads, primary roads, bypasses, local roads, paved roads and unpaved roads.

15. At least one computer-readable non-transitory storage medium including instructions that, when executed on a processor, cause the processor to:
   compute a plurality of alternate minimum cost routes between a source and a destination in a location-based navigation application based on static costs of traveling one or more segments of the alternate minimum cost routes without traffic;
   compute dynamic costs of traveling the one or more segments of the alternate minimum cost routes with traffic; and
   rank the alternate minimum cost routes between the source and the destination based on a comparison of the dynamic costs of traveling the one or more segments with traffic to the static costs of traveling the one or more segments without traffic.

16. The at least one computer-readable medium of claim 15, the instructions further causing the processor to quantify a local optimality of the one or more segments of the alternate minimum cost routes based on whether the dynamic costs of traveling the one or more segments exceeds a minimum acceptable traffic cost based on live traffic data.

17. The at least one computer-readable medium of claim 16, wherein to quantify the local optimality of the one or more segments of the alternate minimum cost routes, the instructions further cause the processor to:
   break the alternate minimum cost routes into the one or more segments;
   determine, for each segment, whether a segment exceeds a minimum acceptable traffic cost based on live traffic data;
   add a path restriction for each segment that exceeds the minimum acceptable traffic cost; and
   accumulate a total number of path restrictions added for each of the alternate minimum cost routes.

18. The at least one computer-readable medium of claim 17, wherein to determine whether the dynamic costs of traveling the segment exceeds the minimum acceptable traffic cost based on live traffic data, the instructions further causing the processor to:
   compute a difference between the dynamic costs of traveling the segment and the static costs of traveling the segment; and
   determine whether the difference exceeds a threshold amount.

19. The at least one computer-readable medium of claim 15, the instructions further causing the processor to compute an amount of overlap between each of the alternate minimum cost routes, wherein ranking the alternate minimum cost routes includes determining which alternate minimum cost routes are associated with routes having a least amount of overlap with other alternate minimum cost routes.

20. The at least one computer-readable medium of claim 15, the instructions further causing the processor to compute an amount of overlap between a current route being followed in the location-based navigation application and each of the alternate minimum cost routes, wherein ranking the alternate minimum cost routes includes determining which alternate minimum cost routes have a least amount of overlap with the current route.

21. The at least one computer-readable medium of claim 15, wherein the costs of traveling the one or more segments include any one or more of travel time, tolls encountered, and penalties associated with a type of roadway, the type of roadway including any one or more of highways, restricted access roads, restricted speed roads, primary roads, bypasses, local roads, paved roads and unpaved roads.

* * * * *